United States Patent
Buekers et al.

[11] Patent Number: 5,623,026
[45] Date of Patent: Apr. 22, 1997

[54] SILOXANES CONTAINING EPOXY GROUPS, AND MIXTURES THEREOF WITH POLYCARBONATES

[75] Inventors: Josef Buekers; Peter Bier, both of Krefeld; Sabine Schlitte, Langenfeld; Hubertus Eversheim, Wermelskirchen; Helmut-Martin Meier, Ratingen, all of Germany

[73] Assignee: Bayer Aktiengesellschaft, Leverkusen, Germany

[21] Appl. No.: 587,454

[22] Filed: Dec. 28, 1995

Related U.S. Application Data

[62] Division of Ser. No. 494,808, Jun. 26, 1995, abandoned.

[30] Foreign Application Priority Data

Jul. 8, 1994 [DE] Germany .................. 44 24 105.4

[51] Int. Cl.⁶ .................................................. C08F 283/02
[52] U.S. Cl. .................. 525/463; 525/464; 525/474; 528/26; 528/27; 528/31; 528/33; 528/37; 528/43; 528/370; 528/371
[58] Field of Search ........................... 525/463, 464, 525/474; 528/26, 27, 31, 33, 37, 43, 370, 371

[56] References Cited

U.S. PATENT DOCUMENTS

| | | | |
|---|---|---|---|
| 3,971,756 | 7/1976 | Bialous et al. | 525/464 |
| 4,221,728 | 9/1980 | Jaquiss et al. | 525/464 |
| 4,390,651 | 6/1983 | Brown, Jr. | 525/464 |
| 4,393,158 | 7/1983 | Miller | 524/114 |
| 4,908,274 | 3/1990 | Jachmann et al. | 428/452 |
| 5,100,960 | 3/1992 | Grigo et al. | 525/464 |
| 5,104,945 | 4/1992 | Eckel et al. | 525/464 |
| 5,109,076 | 4/1992 | Freitag et al. | 525/464 |
| 5,187,251 | 2/1993 | Jachmann et al. | 528/15 |
| 5,292,827 | 3/1994 | Raleigh et al. | 525/390 |
| 5,354,796 | 10/1994 | Creecy et al. | 525/464 |
| 5,391,600 | 2/1995 | Umeda et al. | 525/464 |
| 5,401,578 | 3/1995 | Lucarelli et al. | 525/464 |

FOREIGN PATENT DOCUMENTS

| | | | |
|---|---|---|---|
| 652989 | 11/1962 | Canada | 528/27 |
| 1091383 | 12/1980 | Canada | |
| 0281681 | 9/1988 | European Pat. Off. | |
| 0468305 | 1/1992 | European Pat. Off. | |
| 0505869 | 9/1992 | European Pat. Off. | |
| 0620242 | 10/1994 | European Pat. Off. | |
| 2343275 | 3/1975 | Germany | 525/464 |

*Primary Examiner*—John C. Bleutge
*Assistant Examiner*—Randy Gulakowski
*Attorney, Agent, or Firm*—Connolly and Hutz

[57] ABSTRACT

Siloxanes containing epoxy groups having the formula 1

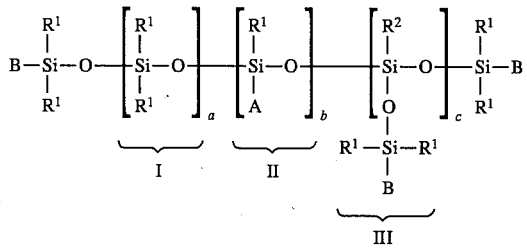

Formula 1
wherein
A means a $C_1$–$C_{20}$ alkyl radical with epoxy groups
B means $R^1$ or A
$R^1$, $R^2$ independently of each other, means $C_1$–$C_{20}$ alkyl or $C_6$–$C_{10}$ aryl
a means zero or a whole number from 1–100
b means zero or a whole number from 1–100
c means a whole number from 1–5.

6 Claims, No Drawings

SILOXANES CONTAINING EPOXY GROUPS, AND MIXTURES THEREOF WITH POLYCARBONATES

This application is a division of application Ser. No. 08/494,808 filed on Jun. 26, 1995 now abandoned.

The invention relates to siloxanes containing epoxy groups having the formula 1

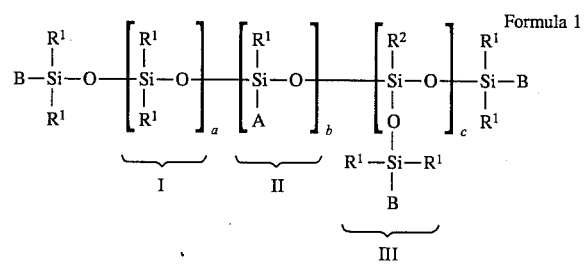

wherein

A means a $C_1$–$C_{20}$ alkyl radical with epoxy groups

B means $R^1$ or A $R^1$, $R^2$ independently of each other, mean $C_1$–$C_{20}$ alkyl or $C_6$–$C_{10}$ aryl a means zero or a whole number from 1–100 b means zero or a whole number from 1–100 c means a whole number from 1–5.

In preference, at least 40% of the silicon atoms are substituted with a radical A, and the structural components I, II and III are contained in blocks or randomly distributed in the polymer.

Particularly preferred siloxanes having the formula 1 are those in which the general radicals have the following meaning:

1)
$R^1$, $R^2$=independently of each other, methyl, ethyl, propyl, butyl, octyl, isooctyl, 2-ethylhexyl, phenyl, naphthyl,
B=$R^1$ or A,
a=0–50,
b=0–50,
c=1 to 5,
A=γ-glycidoxypropyl, 4,5-epoxypentyl, γ-glycidoxybutyl, γ-glycidoxyhexyl, γ-glycidoxyoctyl, glycidoxy-o,p-phenyl, 5,6-epoxyhexyl, 7,8-epoxyoctyl, 9,10-epoxydecyl, β-3,4-(epoxycyclohexyl)-ethyl, β-3,4-(epoxycyclohexyl)-propyl, 2)
$R^1$=$CH_3$
$R^2$=$C_6H_5$
B=$R^1$
a=0–25
b=0–25
c=1–5
A=γ-glycidoxypropyl 3)
$R^1$, $R^2$=independently of each other, $CH_3$, $C_6H_5$
B=$R^1$
a=0–25
b=0–25
c=1–5
A=γ-glycidoxypropyl.

Said siloxanes are characterised by low volatility and may be prepared by addition of suitable Si—H siloxanes to α,β-unsaturated epoxy compounds (hydrolysis).

The invention also relates to mixtures of aromatic polycarbonates and said siloxanes containing 0.001 to 2.5% by wt., preferably 0.005 to 0.25% by wt. of the siloxane, based on the total mixture. Said mixtures may be prepared directly in a known manner by melt compounding or melt extrusion at temperatures of 260° C. to 360° C. They are characterised by outstanding properties in terms of temperature ageing, such as little yellowing, low transmission loss and little reduction in molecular weight.

Moreover, the resistance to hydrolysis is improved.

Polycarbonates suitable for the mixtures are high molecular weight, thermoplastic, aromatic polycarbonates with $\overline{M}_w$ (weight average of the molecular weight) of at least 10,000, preferably 20,000 to 300,000, preferably those containing bifunctional carbonate structural units having the formula (I),

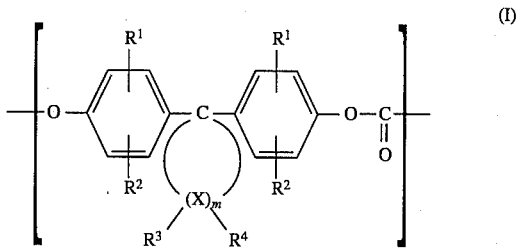

wherein $R^1$ and $R^2$, independently of each other, mean hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$ alkyl, particularly benzyl, m means a whole number from 4 to 7, preferably 4 or 5, $R^3$ and $R^4$, which can be chosen individually for each X, independently of each other, mean hydrogen or $C_1$–$C_6$ alkyl, and X means carbon, provided that on at least one atom X, $R^3$ and $R^4$ simultaneously mean alkyl.

Starting products for the polycarbonates A are dihydroxydiphenyl cycloalkanes having the formula (Ia)

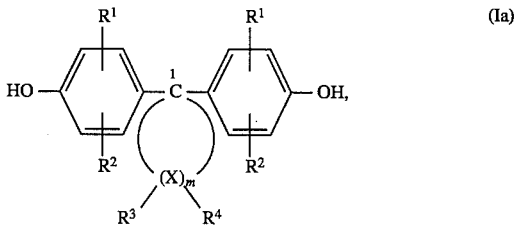

wherein

X, $R^1$, $R^2$, $R^3$, $R^4$ and m have the meaning given for formula (I).

In preference, on 1–2 atoms X, particularly only on one atom X, $R^3$ and $R^4$ are simultaneously alkyl.

A preferred alkyl radical is methyl; the X atoms in the α position to the diphenyl-substituted C atom (C-1) are preferably not dialkyl-substituted, on the other hand, alkyl disubstitution in the β position to C-1 is preferred.

Dihydroxydiphenyl cycloalkanes with 5 and 6 cyclic C atoms in the cycloaliphatic radical (m=4 or 5 in formula (Ia)) are preferred, for example, the diphenols having the formulae (Ib) to (Id),

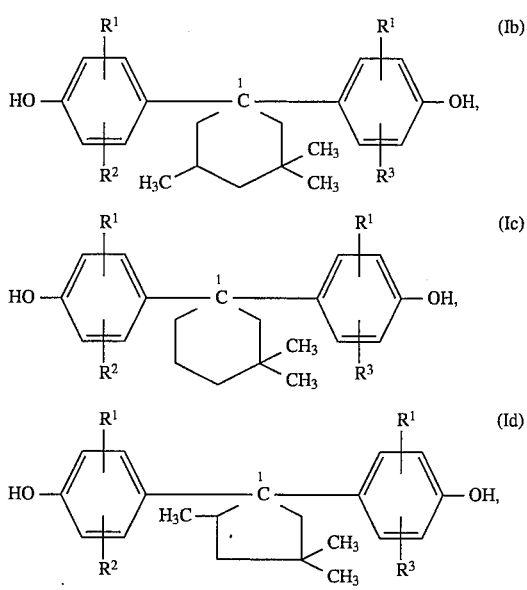

where 1,1-bis-(4-hydroxyphenyl)-3,3,5-trimethylcyclohexane (formula (Ib) with $R^1$ and $R^2$ equal to H) is particularly preferred. The polycarbonates A may be prepared from diphenols having the formula (Ia) according to the German patent application P 3 832 396.6 (Le A 26 344).

Both a diphenol having the formula (Ia), with the formation of homopolycarbonates, and several diphenols having the formula (Ia), with the formation of copolycarbonates, may be used.

Moreover, the diphenols having the formula (Ia) may also be used in mixture with other diphenols, for example, with those having the formula (Ie)

HO—Z—OH   (Ie), and diphenols having the formula (Ie) may also be used alone for the preparation of high molecular weight, thermoplastic, aromatic polycarbonates.

Other suitable diphenols having the formula (Ie) are those in which Z is an aromatic radical with 6 to 30 C atoms, which may contain one or more aromatic nuclei, may be substituted, and may contain aliphatic radicals or cycloaliphatic radicals other than those having the formula (Ia), or heteroatoms as bridge members.

Examples of diphenols having the formula (Ie) are: Hydroquinone, resorcinol, dihydroxydiphenyls, bi-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxyphenyl)-diisopropylbenzenes, and compounds thereof alkylated and halogenated in the nucleus.

These and other suitable diphenols are described in e.g. U.S. Pat. Nos. 3,028,365, 2,999,835, 3,148,172, 3,275,601, 2,991,273, 3,271,367, 3,062,781, 2,970,131, and 2,999,846, in DE-A 1 570 703, 2 063 050, 2 063 052, 2 211 956, FR A 1 561 518, and in the monograph "H. Schnell, Chemistry and Physics of Polycarbonates, Interscience Publishers, New York 1964".

Other preferred diphenols are, for example:

4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred diphenols having the formula (Ie) are, for example:

2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, and 1,1-bis-(4-hydroxyphenyl)-cyclohexane.

In particular, 2,2-bis-(4-hydroxyphenyl)-propane is preferred. The other diphenols may be used both individually and in mixture.

If diphenols having the formula (Ia) are used, the molar ratio of diphenols having the formula (Ia) to the other diphenols having the formula (Ie) optionally to be used at the same time is 100 mole % (Ia) to 0 mole % (Ie) to 2 mole % (Ia) to 98 mole % (Ie), preferably 100 mole % (Ia) to 0 mole % (Ie) to 5 mole % (Ia) to 95 mole % (Ie), and particularly 100 mole % (Ia) to 0 mole % (Ie) to 10 mole % (Ia) to 90 mole % (Ie), and quite particularly 100 mole % (Ia) to 0 mole % (Ie) to 20 mole % (Ia) to 80 mole % (Ie).

The high molecular weight polycarbonates from the diphenols having the formula (Ie) and/or (Ia) may be prepared according to the known polycarbonate preparation processes. In so doing, the various diphenols may be joined to each other both in a random manner and in blocks.

The polycarbonates may be branched in an inherently known way. If branching is desired, it may be achieved in a known way by condensation of small quantities, preferably quantities of between 0.05 and 2.0 mole % (based on diphenols used) of trifunctional or more than trifunctional compounds, particularly those with three or more than three phenolic hydroxyl groups. Some branching agents with three or more than three phenolic hydroxyl groups are:

phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-is-(2-hydroxy-5-methylbenzyl)-4-methylphenol, 2-(4-hydroxyphenyl)-2-(2,4-dihydroxyphenyl)-propane, hexa-[4-(4-hydroxyphenyl-isopropyl)-phenyl]-orthoterephthalic ester, tetra-(4-hydroxyphenyl)-methane, tetra-[4-(4-hydroxyphenylisopropyl)phenoxy]-methane, and 1,4-bis-[4',4''-dihydroxytriphenyl)-methyl]-benzene.

Some of the other trifunctional compounds are 2,4-dihydroxybenzoic acid, trimesic acid, cyanuric chloride, and 3,3-bis-(3-methyl-4-hydroxyphenyl)-2-oxo-2,3-dihydroindole.

Monofunctional compounds in customary concentrates are used as chain-stopping agents for the inherently known control of the molecular weight of polycarbonates A. Suitable compounds are, for example, phenol, tert.-butylphenols or other alkyl $C_1$–$C_7$-substituted phenols. In particular, small quantities of phenols having the formula (If) are suitable for regulating the molecular weight

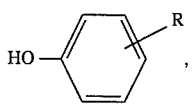

wherein

R means a branched $C_8$ and/or $C_9$ alkyl radical.

In preference, the proportion of $CH_3$ protons in the alkyl radical R is between 47 and 89%, and the proportion of CH and $CH_2$ protons is between 53 and 11%; likewise in preference, R is in the o- and/or p-position to the OH group, and in particular preference, the upper limit of the ortho proportion is 20%. The chain-stopping agents are generally used in quantities of 0.5 to 10, preferably 1.5 to 8 mole %, based on diphenols used.

The polycarbonates A may be prepared preferably in an inherently known way according to the interfacial behaviour (compare H. Schnell "Chemistry and Physics of Polycarbonates", Polymer Reviews, Vol. IX, page 33 ff, Interscience Publ. 1964).

In this case, the diphenols having the formula (Ie) and/or (Ia) are dissolved in the aqueous alkaline phase. Chain-stopping agents e.g. having the formula (If) may be added to regulate the molecular weight. The reaction is then carried out in the presence of an inert, preferably polycarbonate-dissolving, organic phase with phosgene according to the interfacial condensation method. The reaction temperature is between 0° C. and 40° C.

The branching agents optionally used at the same time (preferably 0.05 to 2.0 mole %) may be charged either with the diphenols in the aqueous alkaline phase or added before phosgenation, dissolved in the organic solvent. Apart from the diphenols having the formula (Ia) and/or (Ie), the mono- and/or bis-chloroformic acid esters thereof may also be used, these being added dissolved in organic solvents. The quantity of chain-stopping agents and branching agents then depends on the molar quantity of diphenolate groups; if chloroformic acid esters are used at the same time, the quantity of phosgene may be reduced accordingly in a known way.

Suitable organic solvents for the chain-stopping agents and optionally for the branching agents and the chloroformic acid esters are, for example, methylene chloride, chlorobenzene, acetone, acetonitrile and mixtures of said solvents, particularly mixtures of methylene chloride and chlorobenzene. Optionally, the chain-stopping agents and branching agents used may be dissolved in the same solvent.

Methylene chloride, chlorobenzene and mixtures of methylene chloride and chlorobenzene, for example, are used as the organic phase for interfacial polycondensation.

NaOH solution, for example, is used as the aqueous alkaline phase. The preparation of polycarbonates A according to the interfacial process may be catalysed in the usual manner by catalysts such as tertiary amines, particularly tertiary aliphatic amines such as tributylamine or triethylamine; the catalysts may be used in quantities of 0.05 to 10 mole %, based on moles of diphenols used. The catalysts may be added before phosgenation commences, or during or after phosgenation.

The polycarbonates A may be prepared according to the known process in the homogeneous phase, the "pyridine process" and according to the known melt transesterification process using, for example, diphenyl carbonate instead of phosgene.

The polycarbonates A have preferably a molecular weight $\overline{M}_w$ (weight average, determined by gel chromatography after prior calibration) of at least 2,000, particularly preferably 20,000 to 300,000 and in particular 20,000 to 80,000. They may be linear or branched, they are homopolycarbonates or copolycarbonates based on the diphenols having the formula (Ie) and/or (Ia).

As a result of the incorporation of diphenols having formula (Ia), new polycarbonates with good dimensional stability under heat have been produced which also have a good range of properties in other respects. This is particularly true of the polycarbonates based on the diphenols having the formula (Ia) in which m is 4 or 5 and quite particularly true of the polycarbonates based on the diphenols (Ib) in which $R^1$ and $R^2$, independently of each other, have the meaning given for the formula (Ia), and in particular preference are hydrogen.

The particularly preferred polycarbonates A, therefore, are those in which structural units having the formula (I) m is=4 or 5, quite particularly those composed of units having the formula (Ig)

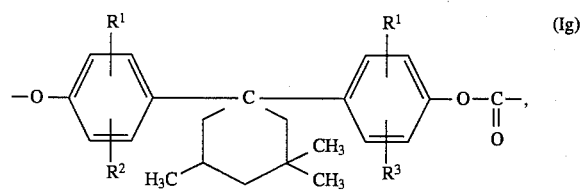

wherein $R^1$ and $R^2$ have the meaning given for the formula (I), but in particular preference are hydrogen.

Said polycarbonates based on the diphenols having the formula (Ib) in which, in particular, $R^1$ and $R^2$ are hydrogen, have a good UV stability in addition to good dimensional stability under heat, and good flow behaviour in the melt, which was not to be expected.

As a result of the optional composition with other diphenols, particularly with those having the formula (Ie), the polycarbonate properties may also be varied in a favourable manner. In such copolycarbonates, the diphenols having formula (Ia) are contained in polycarbonates in quantities of 100 mole % to 2 mole %, preferably in quantities of 100 mole % to 5 mole %, and in particular in quantities of 100 mole % to 10 mole % and quite particularly 100 mole % to 20 mole %, based on the total quantity of 100 mole % of diphenol units.

Said polycarbonates are well known.

Preparation of Suitable SiH Siloxanes

EXAMPLE 1

185 g (0.5 mole) of $[(CH_3)_3SiO_{1/2}]_3[O_{3/2}SiC_6H_5]$, 490 g (0.25 mole) of trimethylsilyl-terminated methylhydrogenpolysiloxane with an average chain length of 30 methylhydrogensiloxy units, 0.7 g of sulphuric acid and 0.35 g of perfluorobutane sulphonic acid are placed in a flask fitted with stirrer, reflux distributor, reflux condenser, thermometer and $N_2$ blanketing, and stirred for 4 hours at 100° C. The mixture is neutralised with 2 g of ammonium carbonate and the siloxane oligomers are heated at up to 100° C. in the filter pump. After filtration, a polysiloxane is obtained with the average composition calculated from the $^1$H-NMR spectrum:

$T^{Ph}(D^H)_{11}M_{3.3}$.

EXAMPLE 2

185 g (0.5 mole) of $[(CH_3)_3SiO_{1/2}]_3[O_{3/2}SiC_6H_5]$, 98.1 g (0.05 mole) of trimethylsilyl-terminated methylhydrogenpolysiloxane with an average chain length of 30 methylhydrogen siloxy units, 0.7 g of sulphuric acid and 0.35 g of perfluorobutane sulphonic acid are placed in a flask fitted with stirrer, reflux distributor, reflux condenser, thermometer and $N_2$ blanketing, and stirred for 4 hours at 100° C. The mixture is neutralised with 2 g of ammonium carbonate and the siloxane oligomers are heated at up to 100° C. in the filter pump. After filtration, a polysiloxane is obtained with the average composition calculated from the $^1$H-NMR spectrum:

$T^{Ph}(D^H)_{2.8}M_{2.3}$.

EXAMPLE 3

291 g (0.5 mole) of $[(CH_3)_3SiO_{1/2}SiC_6H_5]_2$, 490 g (0.25 mole) of trimethylsilyl-terminated methylhydrogen polysiloxane with an average chain length of 30 methylhydrogen siloxy units, 0.7 g of sulphuric acid and 0.35 g of perfluorobutane sulphonic acid are placed in a flask fitted with stirrer, reflux distributor, thermometer and $N_2$ blanketing, and stirred for 4 hours at 100° C. The mixture is neutralised with 2 g of ammonium carbonate and the siloxane oligomers are heated at up to 100° C. in the filter pump. After filtration, a polysiloxane is obtained with the average composition calculated from the $^1$H-NMR spectrum:

$(T^{Ph})_2(D^H)_{12.8}M_{3.6}$.

EXAMPLE 4

369 g (0.5 mole) of $[(CH_3)_3SiO_{1/2}SiC_6H_5]_3$, 981 g (0.5 mole) of trimethylsilyl-terminated methylhydrogen polysiloxane with an average chain length of 30 methylhydrogen siloxy units, 1.4 g of sulphuric acid and 0.7 g of perfluorobutane sulphonic acid are placed in a flask fitted with stirrer, reflux distributor, reflux condenser, thermometer and $N_2$ blanketing, and stirred for 4 hours at 100° C. The mixture is neutralised with 3.7 g of ammonium carbonate and the siloxane oligomers are heated at up to 100° C. in a vacuum pump.

After filtration, a polysiloxane is obtained with the average composition calculated from the $^1$H-NMR spectrum:

$(T^{Ph})_3(D^H)_{27}M_5$.

Addition (Hydrosilylation with the Products of Examples 1–4)

142 g (1.25 mole) of allyl glycidyl ether per mole of SiH to be reacted are placed in a flask fitted with stirrer, reflux distributor, reflux condenser, thermometer, dropping funnel and $N_2$ blanketing. 50 ppm of platinum, based on the total reaction mixture, as $H_2PtCl_6$ on activated carbon (Norite CN 1) as support are added as catalyst. The mixture is heated to 60° C. and the SiH component is metered such that 100° C. is not exceeded. Stirring is continued for 3 hours at 100° C. After a test for complete conversion of the SiH groups with methanolic KOH solution, the excess allyl glycidyl ether is removed by heating at up to 130° C. at a pressure of <10 mbar.

| Addition compound from example | Viscosity 23° C. (mPas) | Composition calculated from $^1$H-NMR |
|---|---|---|
| 1 | 500 | $T^{Ph}D^*_{11}M_{3.3}$ |
| 2 | 101 | $T^{Ph}D^*_{2.6}M_3$ |
| 3 | 565 | $T^{Ph}_2D^*_{13}M_{4.3}$ |
| 4 | 1477 | $T^{Ph}_3D^*_{16}M_6$ |

Explanation of the Abbreviations:

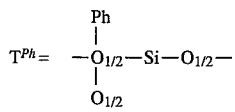

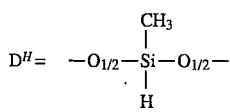

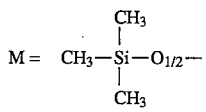

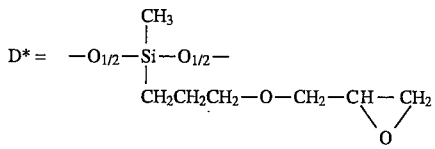

Main constituent according to example 1

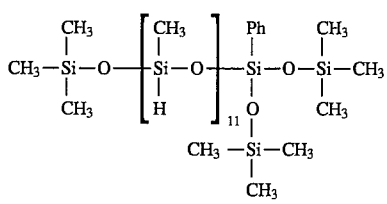

Main constituent according to example 2

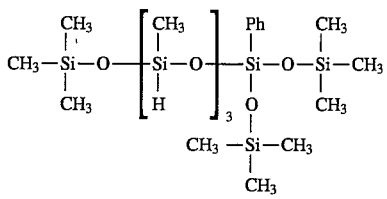

Main constituent according to example 3

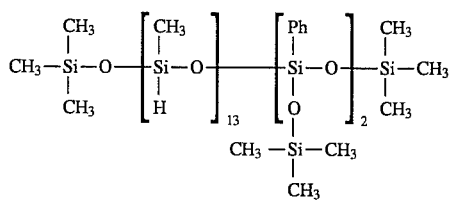

Main constituent according to example 4

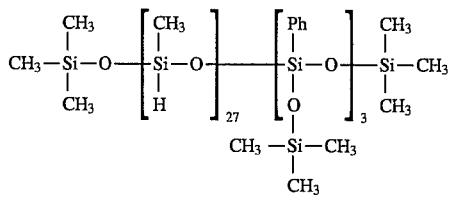

We claim:
1. A mixture comprising aromatic polycarbonate and siloxane having the formula (1)

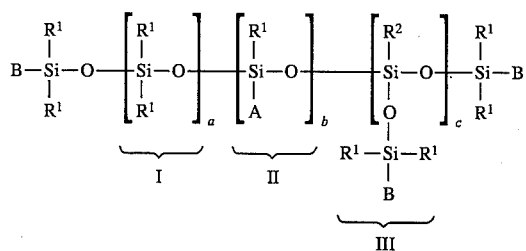

wherein
A is a $C_1$–$C_{20}$ alkyl radical with epoxy groups,
B is $R^1$ or A,
$R^1$, $R^2$ independently of each other, is $C_1$–$C_{20}$ alkyl or $C_6$–$C_{10}$ aryl,
a is zero or a whole number from 1–100,
b is zero or a whole number from 1–100,
c is a whole number from 1–5; and wherein the mixture contains 0.001 to 2.5% by weight of the siloxane, based on total mixture weight.

2. The mixture according to claim 1, wherein the aromatic polycarbonate is a high molecular weight, thermoplastic aromatic polycarbonate with $\overline{M}_w$ (weight average molecular weight) of at least 10,000, which contains bifunctional carbonate structural units having the formula (I)

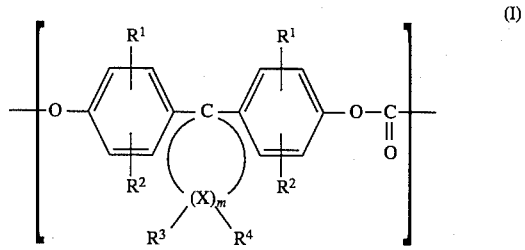

wherein
$R^1$ and $R^2$ independently of each other, are hydrogen, halogen, $C_1$–$C_8$ alkyl, $C_5$–$C_6$ cycloalkyl, $C_6$–$C_{10}$ aryl, or $C_7$–$C_{12}$ aralkyl,
m is a whole number from 4 to 7,
$R^3$ and $R^4$ which can be chosen individually for each X, independently of each other, are hydrogen or $C_1$–$C_6$ alkyl, and
X is carbon,
provided that on at least one atom X, $R^3$ and $R^4$ simultaneously are alkyl.

3. The mixture according to claim 2, wherein the aromatic polycarbonate has a weight average molecular weight of between 20,000 to 300,000.

4. The mixture according to claim 2, wherein in formula (I), $R^1$ and $R^2$ independently of each other are chlorine, bromine, phenyl or benzyl.

5. The mixture according to claim 2, wherein in formula (I), m is 4 or 5.

6. The mixture according to claim 1, containing 0.005 to 0.25% by weight of siloxane of formula (1).

* * * * *